(12) United States Patent
Takata et al.

(10) Patent No.: US 11,539,913 B2
(45) Date of Patent: Dec. 27, 2022

(54) RECORDING CONTROL DEVICE, RECORDING CONTROL SYSTEM, RECORDING CONTROL METHOD, AND COMPUTER PROGRAM

(71) Applicant: JVCKENWOOD Corporation, Yokohama (JP)

(72) Inventors: Ryohei Takata, Yokohama (JP); Ayane Tsubouchi, Yokohama (JP); Kotaro Mantani, Yokohama (JP); Yuki Oyama, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

(21) Appl. No.: 17/370,010

(22) Filed: Jul. 8, 2021

(65) Prior Publication Data

US 2021/0337160 A1    Oct. 28, 2021

Related U.S. Application Data

(63) Continuation of application No. PCT/JP2019/045836, filed on Nov. 22, 2019.

(30) Foreign Application Priority Data

| Jan. 11, 2019 | (JP) | ............................. | JP2019-003194 |
| Jan. 11, 2019 | (JP) | ............................. | JP2019-003195 |
| Jan. 11, 2019 | (JP) | ............................. | JP2019-003708 |

(51) Int. Cl.
*H04N 5/76* (2006.01)
*H04N 7/18* (2006.01)
*H04N 5/18* (2006.01)

(52) U.S. Cl.
CPC .............. *H04N 5/76* (2013.01); *H04N 7/183* (2013.01)

(58) Field of Classification Search
USPC .................... 386/228, 239, 291, 292, 293
See application file for complete search history.

(56) References Cited

U.S. PATENT DOCUMENTS

| 9,809,196 B1* | 11/2017 | Penilla .................... B60L 50/66 |
| 2002/0191952 A1* | 12/2002 | Fiore ........................ H04N 5/76 |
| | | 386/355 |

(Continued)

FOREIGN PATENT DOCUMENTS

| JP | 2006-321357 | 11/2006 |
| JP | 2007-199840 | 8/2007 |

(Continued)

OTHER PUBLICATIONS

International Search Report and Written Opinion for International Application No. PCT/JP2019/045836 dated Feb. 10, 2020, 9 pages.

*Primary Examiner* — Daquan Zhao
(74) *Attorney, Agent, or Firm* — Amin, Turocy & Watson, LLP

(57) ABSTRACT

A recording control device includes: a photographic data acquisition unit that acquires photographic data from a camera that photographs a periphery of a vehicle; a moving object detection unit that detects a moving object from the photographic data acquired by the photographic data acquisition unit while the vehicle is parked; and a recording control unit that correlates detection information of the moving object with the photographic data, records the correlated information in a recording unit as a data file that is capable of being overwritten, and when overwriting of the data file in the recording unit becomes necessary, performs the overwriting by reducing the priority of overwriting on the data file in which the moving object is detected.

6 Claims, 13 Drawing Sheets

(56) References Cited

U.S. PATENT DOCUMENTS

| | | |
|---|---|---|
| 2010/0201819 A1 | 8/2010 | Minowa |
| 2016/0042621 A1* | 2/2016 | Hogg .............. G08B 13/19615 |
| | | 348/155 |
| 2016/0291959 A1* | 10/2016 | Searle .................... H04L 63/10 |

FOREIGN PATENT DOCUMENTS

| | | |
|---|---|---|
| JP | 2009-032143 | 2/2009 |
| JP | 2017-045396 | 3/2017 |
| JP | 2018-173760 | 11/2018 |

* cited by examiner

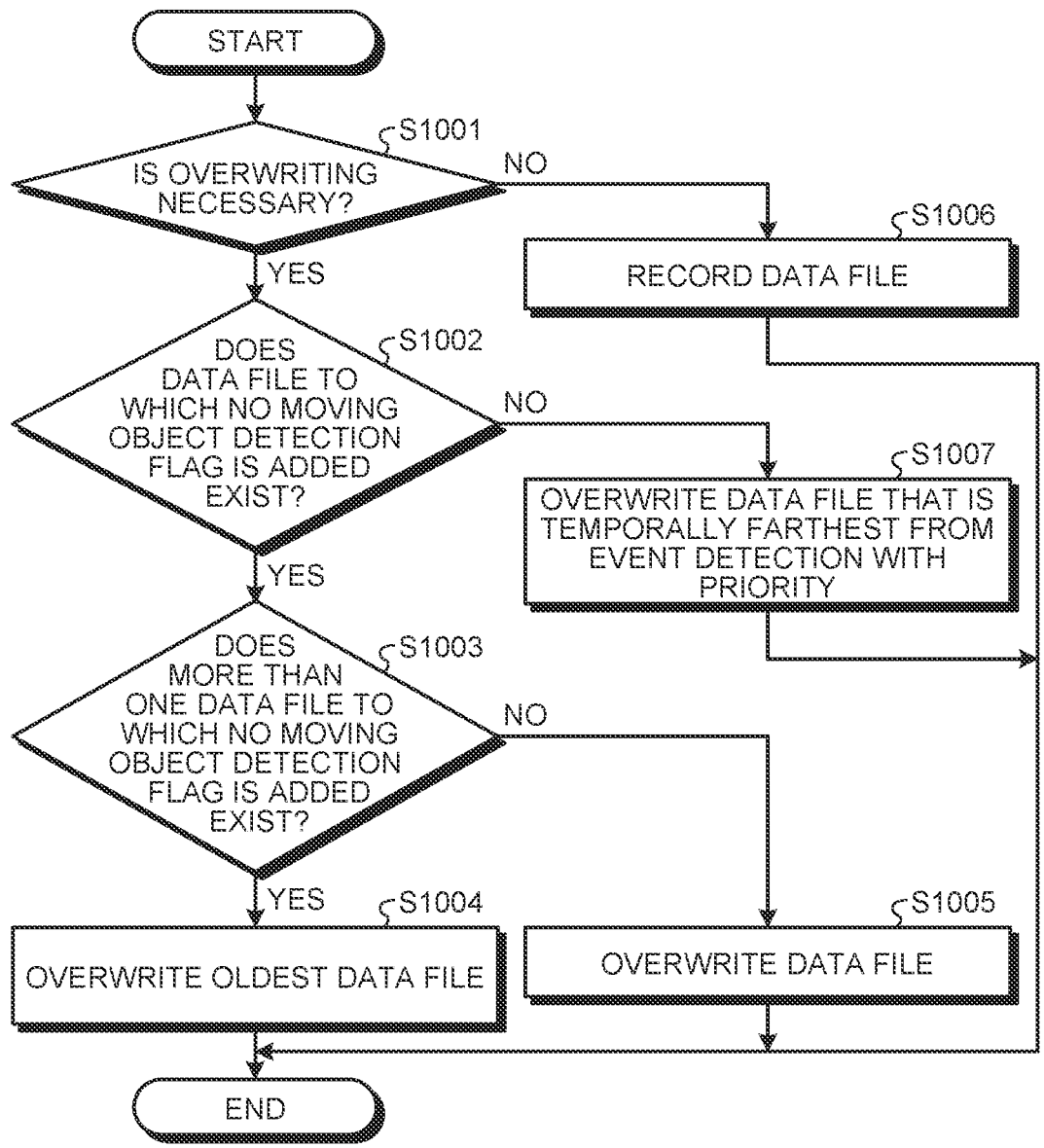

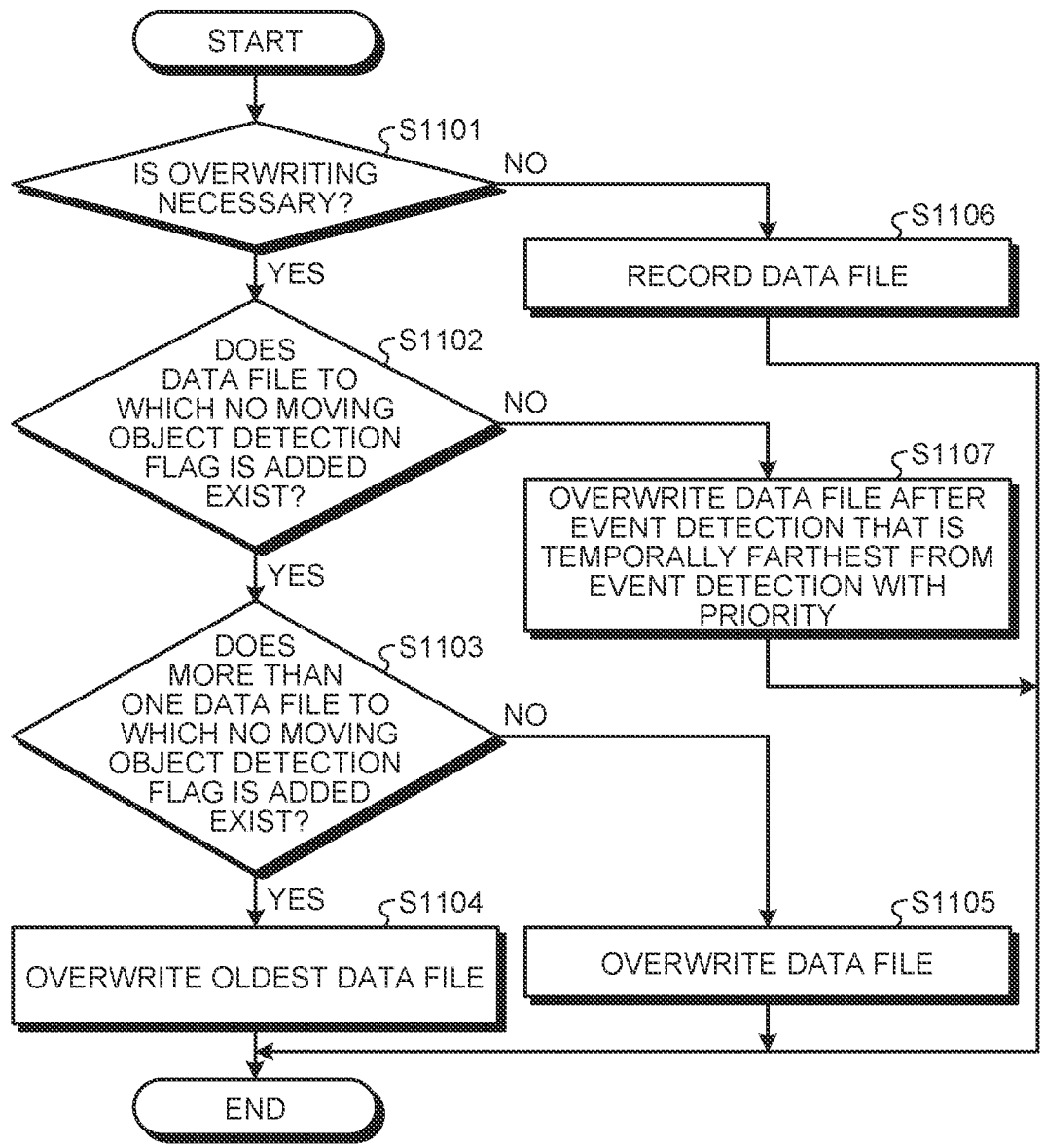

RECORDING CONTROL DEVICE, RECORDING CONTROL SYSTEM, RECORDING CONTROL METHOD, AND COMPUTER PROGRAM

CROSS-REFERENCE TO RELATED APPLICATION(S)

This application is a Continuation of PCT international application Ser. No. PCT/JP2019/045836 filed on Nov. 22, 2019 which designates the United States, incorporated herein by reference, and which claims the benefit of priority from Japanese Patent Application No. 2019-003194, filed on Jan. 11, 2019, Japanese Patent Application No. 2019-003195, filed on Jan. 11, 2019, Japanese Patent Application No. 2019-003708, filed on Jan. 11, 2019, all incorporated herein by reference.

BACKGROUND

1. Technical Field

The present disclosure relates to a recording control device, a recording control system, a recording control method, and a computer program.

2. Description of the Related Art

One of the known dashboard cameras, upon the detection of an impact during the parking of a vehicle or the detection of a moving object from video photographed by a camera, saves the video data at the time of detection as event recording data. For example, Japanese Patent Application Laid-open No. 2006-321357 A discloses a device that records the video data upon the detection of the moving object during the stop.

Many moving objects that are detected in the technique as described in Japanese Patent Application Laid-open No. 2006-321357 A are not relevant to the event for which the video data should be saved. Therefore, in Japanese Patent Application Laid-open No. 2006-321357 A, many pieces of video data that are not really needed to be saved may be saved.

In addition, in Japanese Patent Application Laid-open No. 2006-321357 A, in the case where the video data where the moving object is detected is recorded as data that can be overwritten, the older data in the recording is overwritten in order. Therefore, in Japanese Patent Application Laid-open No. 2006-321357 A, the video data in which the phenomenon related to the occurrence of the event is recorded may be erased by the overwriting.

SUMMARY

It is an object of the present disclosure to at least partially solve the problems in the conventional technology.

A recording control device according to the present disclosure comprising: a photographic data acquisition unit that acquires photographic data from a camera that photographs a periphery of a vehicle; a moving object detection unit that detects a moving object from the photographic data acquired by the photographic data acquisition unit while the vehicle is parked; an event detection unit that detects an event to the vehicle; and a recording control unit that correlates detection information of the moving object with the photographic data, records the correlated information in a recording unit as a data file that is capable of being overwritten, upon the detection of the event by the event detection unit, saves in the recording unit, the photographic data for a period defined at a time when the event is detected, as the data file that must not be overwritten, and when overwriting of the data file in the recording unit becomes necessary, performs the overwriting by reducing priority of the overwriting on the data file in which the moving object is detected in a manner that the priority is lower as the data file is temporally closer to the time when the event is detected.

A recording control system according to the present disclosure comprising: the recording control device according to the present disclosure; a camera that photographs the periphery of the vehicle; and a recording unit that records the data file.

A recording control method according to the present disclosure comprising: a step of acquiring photographic data from a camera that photographs a periphery of a vehicle; a step of detecting a moving object from the photographic data acquired while the vehicle is parked; a step of detecting an event to the vehicle; and a step of correlating detection information of the moving object with the photographic data, recording the correlated information in a recording unit as a data file that is capable of being overwritten, upon the detection of the event by the event detection unit, saving in the recording unit, the photographic data for a period defined at a time when the event is detected, as the data file that must not be overwritten, and when overwriting of the data file in the recording unit becomes necessary, performing the overwriting by reducing priority of the overwriting on the data file in which the moving object is detected in a manner that the priority is lower as the data file is temporally closer to the time when the event is detected.

A non-transitory computer readable recording medium storing therein a computer program according to the present disclosure that causes a computer operating as a recording control device to perform: a step of acquiring photographic data from a camera that photographs a periphery of a vehicle; a step of detecting a moving object from the photographic data acquired while the vehicle is parked; a step of detecting an event to the vehicle; and a step of correlating detection information of the moving object with the photographic data, recording the correlated information in a recording unit as a data file that is capable of being overwritten, upon the detection of the event by the event detection unit, saving in the recording unit, the photographic data for a period defined at a time when the event is detected, as the data file that must not be overwritten, and when overwriting of the data file in the recording unit becomes necessary, performing the overwriting by reducing priority of the overwriting on the data file in which the moving object is detected in a manner that the priority is lower as the data file is temporally closer to the time when the event is detected.

BRIEF DESCRIPTION OF THE DRAWINGS

FIG. 12 is a flowchart illustrating one example of the procedure of the overwriting process of the control unit according to a seventh embodiment.

FIG. 13 is a flowchart illustrating one example of the procedure of the overwriting process of the control unit according to an eighth embodiment.

DETAILED DESCRIPTION OF THE PREFERRED EMBODIMENTS

Embodiments of the present disclosure are hereinafter described in detail with reference to the attached drawings. Note that the present disclosure will not be limited by these embodiments, and if there are a plurality of embodiments, the embodiments may be combined with each other.

First Embodiment

Figure 1:
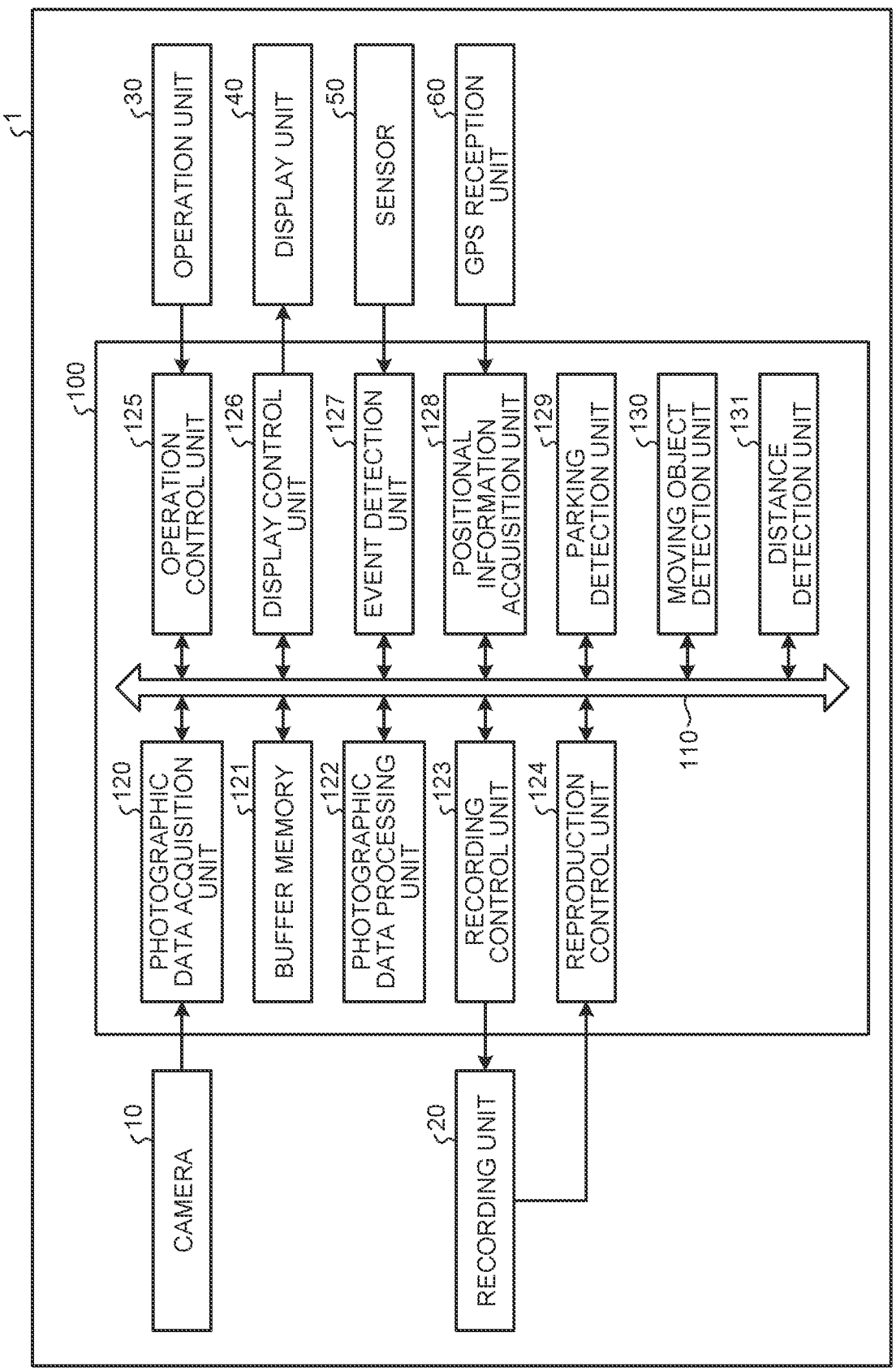
FIG. 1 is a block diagram illustrating one example of a structure of a recording control system according to a first embodiment.

A structure of a recording control system according to a first embodiment is described with reference to FIG. 1. FIG. 1 is a block diagram illustrating one example of the structure of the recording control system according to the first embodiment.

As illustrated in FIG. 1, a recording control system 1 includes a camera 10, a recording unit 20, an operation unit 30, a display unit 40, a sensor 50, a global positioning system (GPS) reception unit 60, and a control unit (recording control device) 100. The recording control system 1 is mounted on a vehicle, and is configured to detect a moving object on the basis of photographic data obtained during parking, correlate detection information of the moving object with the photographic data, and record the correlated information as a data file. In the case where recording the new data file requires overwriting of another data file, the recording control system 1 records the new data file so as not to overwrite the data file in which the moving object is detected.

The recording control system 1 corresponds to what is called a dashboard camera that is mounted on an upper part of a windshield of a vehicle, for example, in a manner that the area ahead of the vehicle can be photographed. The recording control system 1 detects the impact corresponding to a phenomenon that should be detected as an event, such as an accident, and saves the photographic data for the period including the accident occurrence time as event recording data. The recording control system 1 is not limited to the system mounted on the vehicle as a single device, and may be a structure that is achieved as a function of a navigation device, a structure mounted on the vehicle in advance, or a portable device to be mounted on the vehicle.

The camera 10 photographs an image near or around the vehicle on which the recording control system 1 is mounted. The camera 10 photographs an image ahead of or behind the vehicle as the camera included in the dashboard camera. Alternatively, the camera 10 may be a camera unit including a plurality of cameras configured to photograph an image near or around the vehicle or an omni-direction camera. The camera 10 outputs the photographic data obtained by photographing the periphery or circumference of the vehicle to a photographic data acquisition unit 120.

The recording unit 20 records various pieces of data including the event recording data that is recorded upon the event detection. The recording unit 20 records the photographic data that the camera 10 obtains by photographing the periphery or circumference of the vehicle. The recording unit 20 records the photographic data correlated with the detection information of the moving object, for example. In this case, the recording unit 20 records the photographic data correlated with the detection information of the moving object as the data file. The recording unit 20 records the photographic data where the event is detected, as the data file that must not be overwritten.

In addition, the recording unit 20 stores a computer program to achieve each part of the control unit 100. In this case, the control unit 100 develops the computer program stored in the recording unit 20 and executes the computer program, so as to achieve the function of each part. The recording unit 20 can be achieved by, for example, a semiconductor memory element such as a random access memory (RAM) or a flash memory, or a storage device such as a hard disk, a solid state drive, or an optical disc. The recording unit 20 may be formed by a plurality of different memories, for example.

The operation unit 30 receives various kinds of operation on the recording control system 1. The various kinds of operation include, for example, operation of starting to reproduce the event recording data and operation of starting to save the event recording data. The operation unit 30 outputs an operation signal according to the received operation to an operation control unit 125. The operation unit 30 can be achieved by, for example, a physical switch, or a touch panel provided to the display unit 40.

The display unit 40 displays various kinds of video. The display unit 40 displays, for example, the photographic data recorded in the recording unit 20. Examples of the display unit 40 include a liquid crystal display (LCD) and an organic electro-luminescence (EL) display.

The sensor 50 detects various kinds of information based on the occurrence of the event to the vehicle. The sensor 50 is, for example, an acceleration sensor and detects the acceleration applied to the vehicle. The sensor 50 is, for example, a gyro sensor and detects the information about the posture of the vehicle. The sensor 50 outputs the detection result to an event detection unit 127.

The GPS reception unit 60 includes a GPS reception circuit, a GPS reception antenna, and the like, and receives a GPS signal. The GPS reception unit 60 outputs the received GPS signal to a positional information acquisition unit 128.

The control unit 100 includes the photographic data acquisition unit 120, a buffer memory 121, a photographic data processing unit 122, a recording control unit 123, a reproduction control unit 124, the operation control unit 125, a display control unit 126, the event detection unit 127, the positional information acquisition unit 128, a parking detection unit 129, a moving object detection unit 130, and a distance detection unit 131. The respective parts in the control unit 100 are connected to each other through a bus 110. The control unit 100 can be achieved by, for example, an electronic circuit including a central processing unit (CPU).

The photographic data acquisition unit 120 acquires various pieces of photographic data from the outside. The photographic data acquisition unit 120 acquires the photographic data photographed by the camera 10 from the camera 10, for example. The photographic data acquisition unit 120 outputs the photographic data acquired from the camera 10 to the buffer memory 121 and the display control unit 126, for example. The photographic data acquisition unit 120 may acquire the video data photographed by the camera 10 as the photographic data, and may acquire the photographic data including the audio data acquired by a microphone, which is not illustrated, disposed at the camera 10 or at another position in addition to the video data.

The buffer memory 121 is a memory inside the control unit 100 that temporarily stores the photographic data acquired by the photographic data acquisition unit 120. Specifically, the buffer memory 121 temporarily stores the photographic data for a certain time acquired by the photographic data acquisition unit 120 while updating the photographic data.

The photographic data processing unit 122 performs various processes on the photographic data that is temporarily stored in the buffer memory 121. The photographic data acquisition unit 120 converts the photographic data, which is temporarily stored in the buffer memory 121, into an arbitrary file format coded in an arbitrary codec such as H.264 or Moving Picture Experts Group (MPEG-4), for example into the MP4 format. The photographic data processing unit 122 generates the photographic data corresponding to the data file for a certain time from the photographic data that is temporarily stored in the buffer memory 121, for example. Specifically, the photographic data processing unit 122 generates the photographic data for 60 seconds in the order of recording as the data file from the photographic data that is temporarily stored in the buffer memory 121, for example. The photographic data processing unit 122 outputs the generated photographic data to the recording control unit 123. In addition, the photographic data processing unit 122 outputs the generated photographic data to the display control unit 126. The period of the photographic data generated as the data file is 60 seconds in this example; however, the period is not limited to 60 seconds.

The recording control unit 123 records various pieces of data in the recording unit 20. The recording control unit 123 controls to record the photographic data filed in the photographic data processing unit 122, in the recording unit 20, for example.

The recording control unit 123 correlates the detection information of the moving object with the photographic data and records the correlated information in the recording unit 20 as the data file that can be overwritten. In this case, the recording control unit 123 loop-records the data file in the recording unit 20. The recording control unit 123 receives the detection information of the moving object from the moving object detection unit 130. In addition, when overwriting of the data file in the recording unit 20 becomes necessary, the recording control unit 123 performs the overwriting and recording by reducing the priority of the overwriting on the data file in which the moving object is detected. In other words, the recording control unit 123 overwrites the data file in which the moving object is not detected with priority. In addition, the recording control unit 123 may record the photographic data for a predetermined period (for example, 60 seconds) after the moving object is detected. In this case, the predetermined period can be changed arbitrarily by the user.

The recording control unit 123 records in the recording unit 20, the photographic data when the event is detected by the event detection unit 127, as the data file that must not be overwritten. Specifically, when the event detection unit 127 has determined the occurrence of the event, the recording control unit 123 saves the photographic data for a predetermined period including the event detection time and before and after the event detection time as the event recording data that must not be overwritten in the recording unit 20. In other words, the recording control unit 123 records the photographic data when the event detection unit 127 does not detect the event, in the recording unit 20 as the data file that can be overwritten. When the recording capacity in the loop-recording area for recording the data file that can be overwritten in the recording unit 20 becomes full, for example, the recording control unit 123 overwrites the data file starting from the older data file among the photographic data recorded in the recording unit 20 that can be overwritten, with the new data file with priority so as to record the new data file.

When the data file in the recording unit 20 needs to be overwritten, the recording control unit 123 overwrites the data file in which the moving object is detected by reducing the priority of the overwriting on the data file that is temporally close to the time when the event is detected. In other words, the recording control unit 123 overwrites with priority the data file that is temporally far from the time when the event is detected. The recording control unit 123 may perform the overwriting by reducing more the priority of the overwriting on the data file that is temporally closer to the time when the event is detected. In this case, the recording control unit 123 overwrites the data file in order starting from the data file temporally farther with the new data file and records the new data file.

When the data file in which the moving object is detected needs to be overwritten in the recording unit 20, if more than one data file in which the moving object is detected exists, the recording control unit 123 overwrites the data file starting from the data file in which the distance to the moving object is large as the object of the overwriting. Specifically, the recording control unit 123 increases the priority of the overwriting on the data file in which the distance from the vehicle to the moving object is large on the basis of the distance information and overwrites the data file starting from the data file in which the distance from the vehicle to the moving object is large.

In a case where the recording is not always performed, when the event detection unit 127 has determined the occurrence of the event, the recording control unit 123 starts to record from the event detection time and saves the photographic data for a predetermined period after the event detection in the recording unit 20 as the event recording data that must not be overwritten.

The reproduction control unit 124 reproduces various pieces of data recorded in the recording unit 20. The reproduction control unit 124 reproduces the photographic data recorded as the data file in the recording unit 20, for example. The reproduction control unit 124 reproduces the photographic data including the event in the recording unit 20, for example. Specifically, the reproduction control unit 124 reproduces the photographic data in accordance with the control signal according to the operation of the operation unit 30 output from the operation control unit 125.

The operation control unit 125 receives the operation signal about the operation received from the user or the like through the operation unit 30. The operation control unit 125 receives the operation signal about the operation including the start of reproducing the photographic data and the start of recording the photographic data, for example. The operation control unit 125 outputs the control signal according to the received operation signal to the recording control unit 123 or the reproduction control unit 124. In this case, the recording control unit 123 and the reproduction control unit 124 perform the operation in accordance with the control signal.

The display control unit 126 causes the display unit 40 to display various kinds of video. Specifically, by the output of the video signal to the display control unit 126 and the display unit 40, the display unit 40 displays the video. The display control unit 126 outputs the video signal about the photographic data recorded in the recording unit 20 to the display unit 40, so that the display unit 40 displays the photographic data.

The event detection unit 127 receives the detection result by the sensor 50 from the sensor 50. The event detection unit 127 detects the event on the basis of the received detection result. The event detection unit 127 acquires the acceleration information about the acceleration as the detection result, for example. In this case, the event detection unit 127 detects the event on the basis of the acceleration information. Upon the event detection, the event detection unit 127 outputs to the recording control unit 123, the control signal expressing the information that the event is detected.

When the acceleration output from the sensor 50 corresponds to the acceleration when the vehicle collides with another object such as another vehicle, the event detection unit 127 detects this acceleration as the acceleration corresponding to the event. In the detection of the acceleration corresponding to the event, weighting may be performed in each of an x-axis direction, a y-axis direction, and a z-axis direction in the sensor 50 that is a triaxial acceleration sensor. In addition, regarding the detection of the acceleration corresponding to the event, the acceleration whose rise of acceleration is sharp may be the target of the detection.

The event detection unit 127 receives the distance information about the distance from the vehicle to the moving object from the distance detection unit 131. In this case, the event detection unit 127 detects the event on the basis of the distance information. Specifically, the event detection unit 127 detects, as the event, the fact that the distance from the vehicle to the moving object is less than a predetermined distance on the basis of the distance information, for example. The predetermined distance is the distance where the moving object may have some kind of operation on the vehicle, and is 1 m, for example. The predetermined distance may be set by the user arbitrarily.

The positional information acquisition unit 128 receives a GPS signal from the GPS reception unit 60. The positional information acquisition unit 128 calculates the current positional information on the basis of the GPS signal.

The parking detection unit 129 detects the parking of vehicle. The parking detection unit 129 acquires the vehicle information through a controller area network (CAN), for example. The parking detection unit 129 detects, from the vehicle information, the condition that the power from the engine or the like in the vehicle is turned off, the accessary power is turned off, the parking gear is selected, the handbrake is operated, or the current location of the vehicle is in the parking lot, for example. The parking detection unit 129 may detect a combination of various conditions. The parking detection unit 129 detects that the vehicle is parked on the basis of the detected condition.

Figure 2:
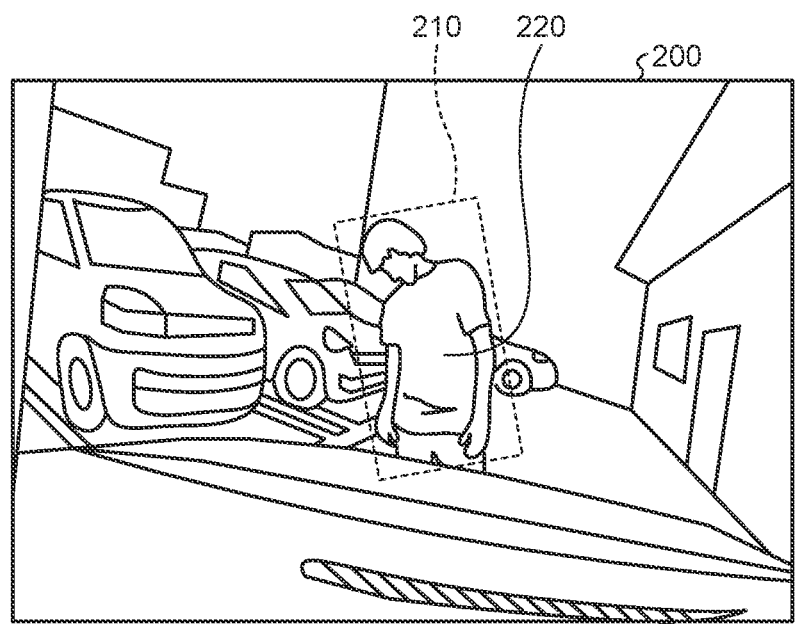
FIG. 2 is a schematic diagram illustrating one example of photographic data.

The moving object detection unit 130 detects the presence or absence of the moving object on the basis of the photographic data acquired by the photographic data acquisition unit 120. The moving object detection unit 130 detects the region where the luminance or color information changes for each frame per unit pixel or unit block with several pixels on each side in the photographic data. For example, as illustrated in FIG. 2, the moving object detection unit 130 detects a moving object region 210 including the moving object (for example, a person 220) from photographic data 200. In this case, the moving object detection unit 130 determines that the moving object is detected when the temporal change is detected in a region with a predetermined area or more. The moving object detection unit 130 may specify the kind of the moving object existing in the moving object region 210 by performing an object recognition process on the moving object region 210, for example. Note that the method of detecting the moving object by the moving object detection unit 130 is not limited to this method and the moving object may be detected using a known method.

The distance detection unit 131 detects the distance from the vehicle to various objects. When the moving object detection unit 130 detects the moving object, for example, the distance detection unit 131 detects the distance from the vehicle to the moving object. In the data file in which the moving object is detected, the distance detection unit 131 detects the distance when the detected moving object is the closest to the vehicle as the distance from the vehicle to the moving object. Specifically, the distance detection unit 131 detects the distance to the moving object on the basis of the photographic data, for example. The method of detecting the distance to the moving object by the distance detection unit 131 is not limited to a particular method, and a known method may be used. For example, the distance detection unit 131 detects the distance to the moving object on the basis of the earth position corresponding to the lowermost position in the range expressing the moving object included in the photographic data. In addition, the distance detection unit 131 may detect the distance from another sensor such as a millimeter wave or sound wave sensor to the moving object. The distance detection unit 131 outputs the distance information about the distance from the vehicle to the moving object to the recording control unit 123 and the event detection unit 127, for example.

Figure 3:
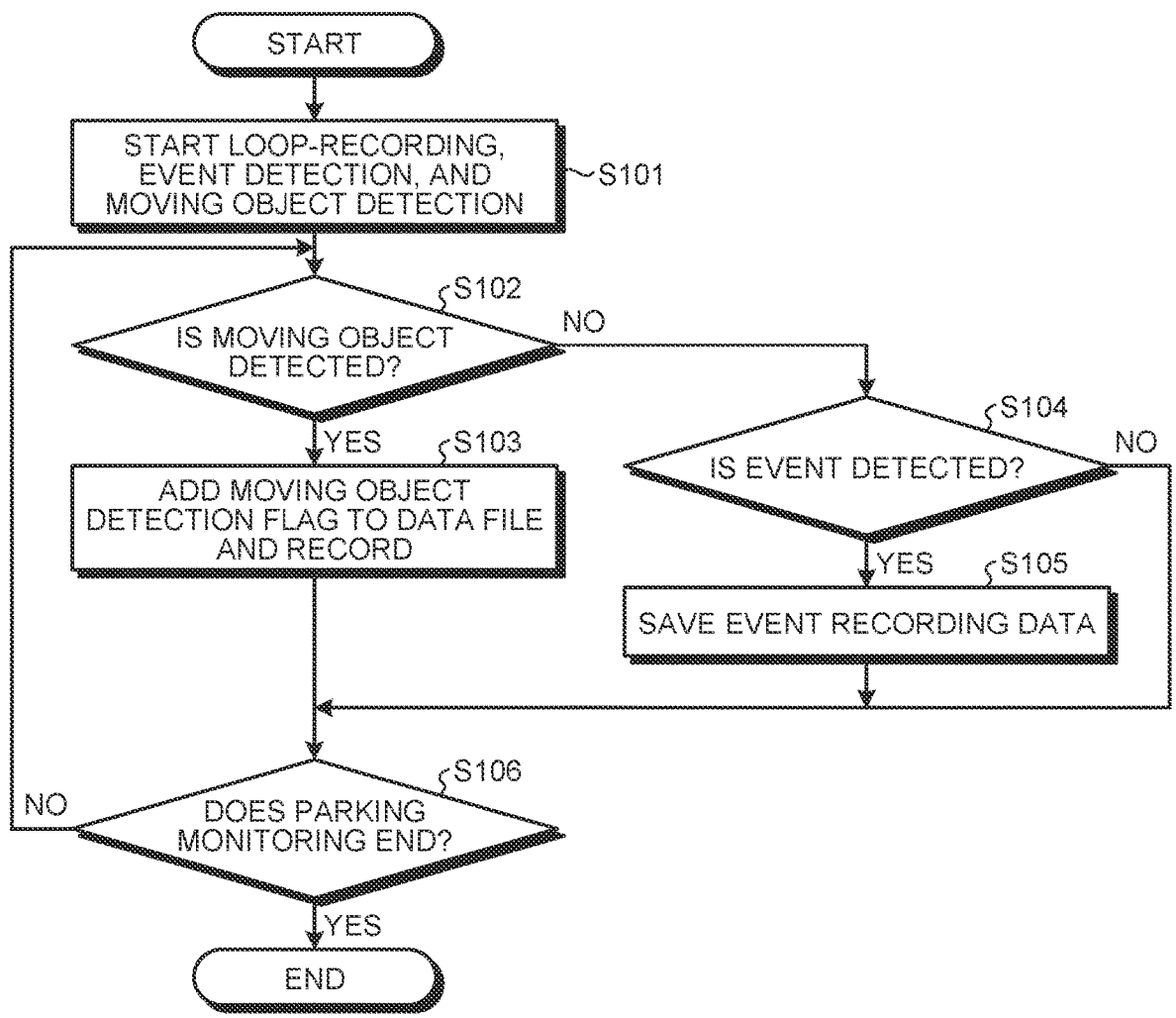
FIG. 3 is a flowchart illustrating one example of the procedure of a process of a control unit according to the first embodiment.

With reference to FIG. 3, the process of the control unit according to the first embodiment is described. FIG. 3 is a flowchart illustrating one example of the procedure of the process of the control unit according to the first embodiment.

The process in FIG. 3 is started when a parking monitoring function of the vehicle is operated. The parking monitoring function of the vehicle is started when the parking detection unit 129 detects that the vehicle is parked or when the start of the parking monitoring function is instructed by the user's operation of the operation unit 30, for example. First, when the parking monitoring function is started, the control unit 100 starts each process of loop-recording, event detection, and moving object detection (step S101). Then, the control unit 100 advances to step S102.

Next, the control unit 100 determines whether the moving object is detected in the photographic data (step S102). If the moving object is detected (Yes at step S102), the control unit 100 advances to step S103, and adds a moving object detection flag, which expresses the detection of the moving object, to the data file of the photographic data and records the data file in the recording unit 20 (step S103). Then, the control unit 100 advances to step S106. On the other hand, if the moving object is not detected (No at step S102), the control unit 100 advances to step S104 and determines whether the event is detected (step S104).

If the event is detected (Yes at step S104), the control unit 100 advances to step S105 and saves the photographic data in the recording unit 20 as the event recording data (step S105). Then, the control unit 100 advances to step S106. On the other hand, if the event is not detected (No at step S104), the control unit 100 advances to step S106.

At step S106, the control unit 100 determines whether the parking monitoring function ends (step S106). If the parking monitoring function does not end (No at step S106), the control unit 100 advances to step S102. On the other hand, if the parking monitoring function ends (Yes at step S106), the control unit 100 ends the process in FIG. 3.

Figure 4:
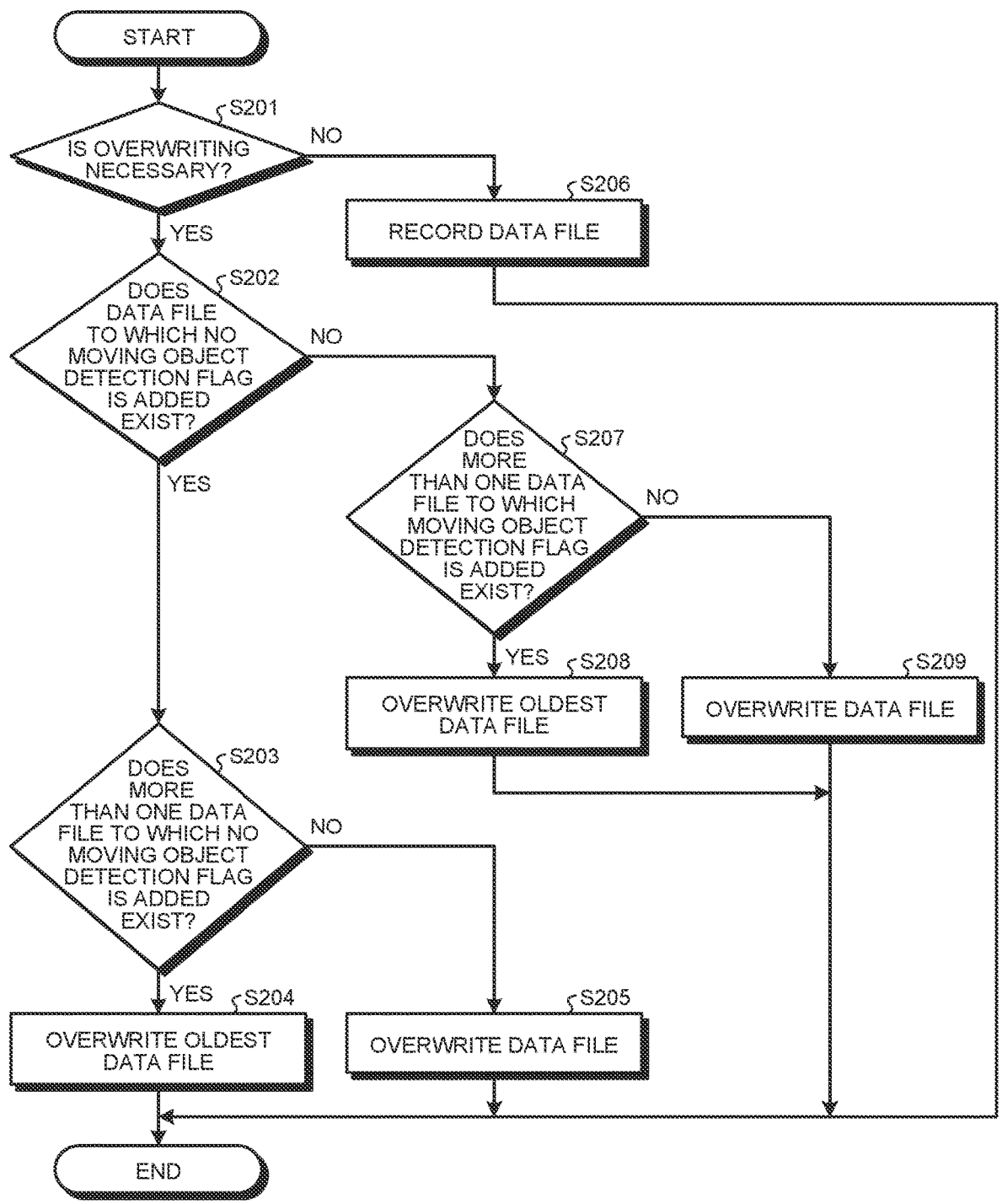
FIG. 4 is a flowchart illustrating one example of the procedure of an overwriting process of the control unit according to the first embodiment.

Next, with reference to FIG. 4, the overwriting process of the control unit according to the first embodiment is described. FIG. 4 is a flowchart illustrating one example of the procedure of the overwriting process of the control unit according to the first embodiment. The process in FIG. 4 is performed every time the data file that can be overwritten is generated.

First, the control unit 100 determines whether the overwriting is necessary in order to record the data file that can be overwritten in the recording unit 20 (step S201). Whether the overwriting is necessary is determined based on whether the recording capacity of the loop-recording area in the recording unit 20 is full. If it is determined that the overwriting is necessary (Yes at step S201), the control unit 100 advances to step S202 and determines whether a data file to which no moving object detection flag is added exists (step S202).

If the data file to which no moving object detection flag is added exists (Yes at step S202), the control unit 100 advances to step S203 and determines whether more than one data file to which no moving object detection flag is added exists (step S203).

If more than one data file to which no moving object detection flag is added exists (Yes at step S203), the control unit 100 advances to step S204 and the oldest data file to which no moving object detection flag is added is overwritten with the new data file (step S204). Then, the control unit 100 ends the process in FIG. 4. On the other hand, if more than one data file to which no moving object detection flag is added does not exist (No at step S203), the control unit 100 advances to step S205 and the data file to which no moving object detection flag is added is overwritten with the new data file (step S205). Then, the control unit 100 ends the process in FIG. 4.

If the overwriting is not necessary at step S201 (No at step S201), the control unit 100 advances to step S206 and records the photographic data in the recording unit 20 as the data file (step S206). The control unit 100 ends the process in FIG. 4.

If the data file to which no moving object detection flag is added does not exist at step S202 (No at step S202), the control unit 100 advances to step S207 and determines whether more than one data file to which the moving object detection flag is added exists (step S207).

If more than one data file to which the moving object detection flag is added exists (Yes at step S207), the control unit 100 advances to step S208 and the oldest data file to which the moving object detection flag is added is overwritten with the new data file (step S208). Then, the control unit 100 ends the process in FIG. 4. On the other hand, if more than one data file to which the moving object detection flag is added does not exist (No at step S207), the control unit 100 advances to step S209 and one data file to which the moving object detection flag is added is overwritten with the new data file (step S209). Then, the control unit 100 ends the process in FIG. 4.

As described above, in the first embodiment, when the photographic data is recorded in the recording unit as the data file, the photographic data can be recorded by overwriting the data file not containing the moving object with priority. In addition, in the first embodiment, in the case where the data file not containing the moving object no longer exists and a plurality of data files exist as candidates to be overwritten, the photographic data can be recorded by overwriting the oldest data file. Thus, the video can be recorded suitably in the first embodiment.

In addition, in the first embodiment, the moving object detection flag may be deleted when a predetermined time (for example, 48 hours) has passed after the flag is added. Thus, in the first embodiment, for example, it is possible to suppress that the capacity of the loop-recording area in the recording unit 20 is consumed by the data file to which the moving object detection flag is added.

Second Embodiment

Figure 5:
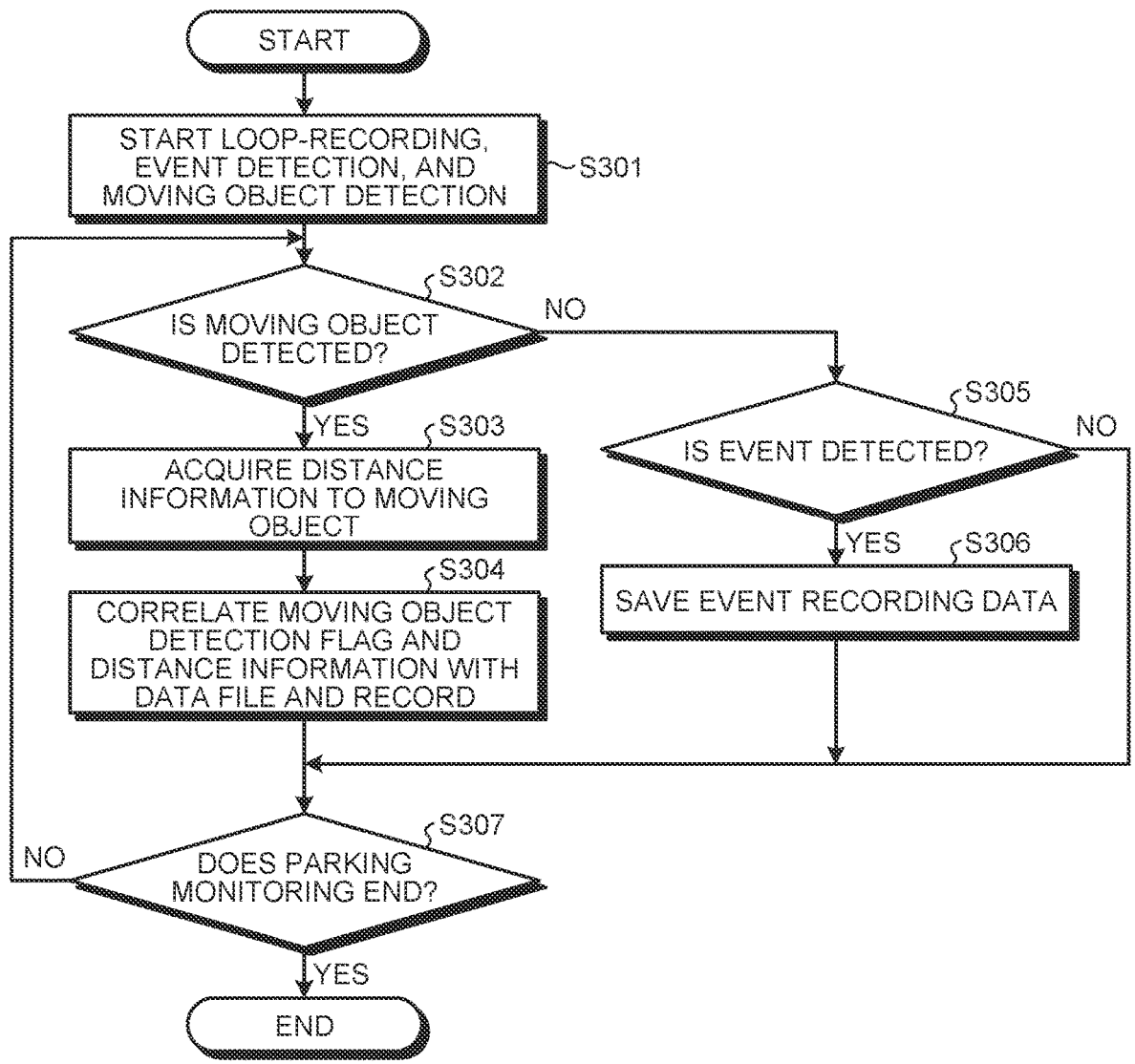
FIG. 5 is a flowchart illustrating one example of the procedure of the process of the control unit according to a second embodiment.

With reference to FIG. 5, a process in the control unit according to a second embodiment is described. FIG. 5 is a flowchart illustrating one example of the procedure of the process in the control unit according to the second embodiment. Note that since the structure of the recording control system according to the second embodiment is the same as that of the recording control system according to the first embodiment, the description is omitted.

Since the processes at step S301 and step S302 are respectively the same as the processes at step S101 and step S102 illustrated in FIG. 3, the description is omitted.

After Yes at step S302, the control unit 100 acquires the distance information to the detected moving object (step S303). At step S303, the distance information acquired by the control unit 100 may be acquired as one value or as the range. For example, the control unit 100 may acquire the distance to the moving object as a particular range section, for example, 0 m to 3 m, 3 m to 5 m, 5 m to 10 m, or 10 m or more.

Next, the control unit 100 correlates the moving object detection flag and the distance information with the data file and records the correlated information in the recording unit 20 (step S304).

Since the processes at step S305 to step S307 are respectively the same as the processes at step S104 to step S106 illustrated in FIG. 3, the description is omitted.

Figure 6:
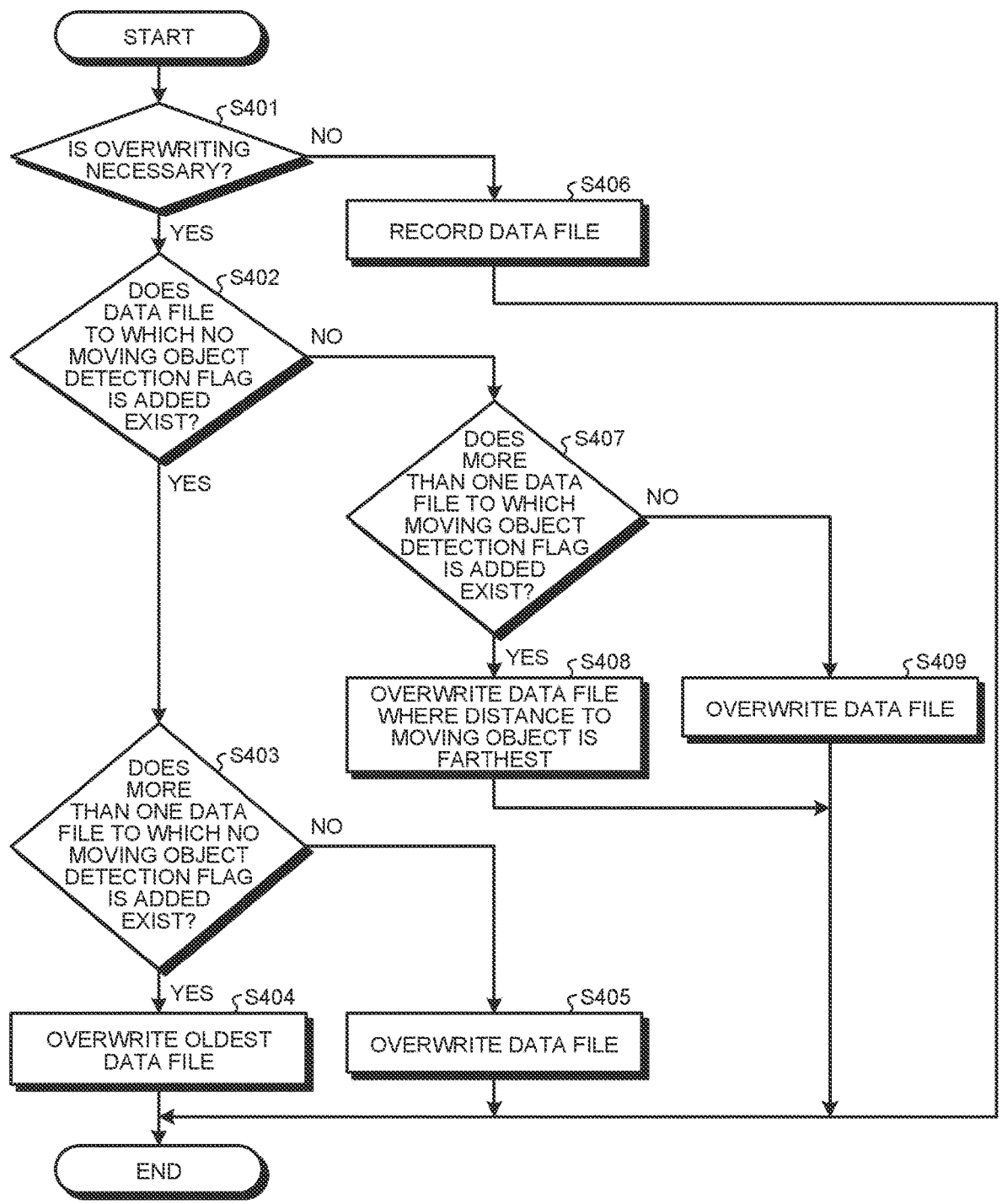
FIG. 6 is a flowchart illustrating one example of the procedure of the overwriting process of the control unit according to the second embodiment.

Next, with reference to FIG. 6, the overwriting process of the control unit according to the second embodiment is described. FIG. 6 is a flowchart illustrating one example of the procedure of the overwriting process of the control unit according to the second embodiment.

Since the processes at step S401 to step S407 are respectively the same as the processes at step S201 to step S207 illustrated in FIG. 4, the description is omitted.

After Yes at step S407, the control unit 100 advances to step S408 and the data file to which the moving object detection flag is added and in which the distance to the moving object is the farthest is overwritten with the new data file (step S408). Then, the control unit 100 ends the process in FIG. 6. On the other hand, after No at step S407, the control unit 100 advances to step S409 and the data file to which the moving object detection flag is added is overwritten with the new data file. Then, the control unit 100 ends the process in FIG. 6.

As described above, in the second embodiment, upon the detection of the moving object, the moving object detection flag and the distance information to the moving object can be correlated with each other and recorded in the data file. As a result, in the second embodiment, in the case where the data file not containing the moving object no longer exists and a plurality of data files exist as candidates to be overwritten, the photographic data can be recorded by overwriting the data file in which the distance to the moving object is the farthest. Thus, the video can be recorded more suitably in the second embodiment.

Third Embodiment

Figure 7:
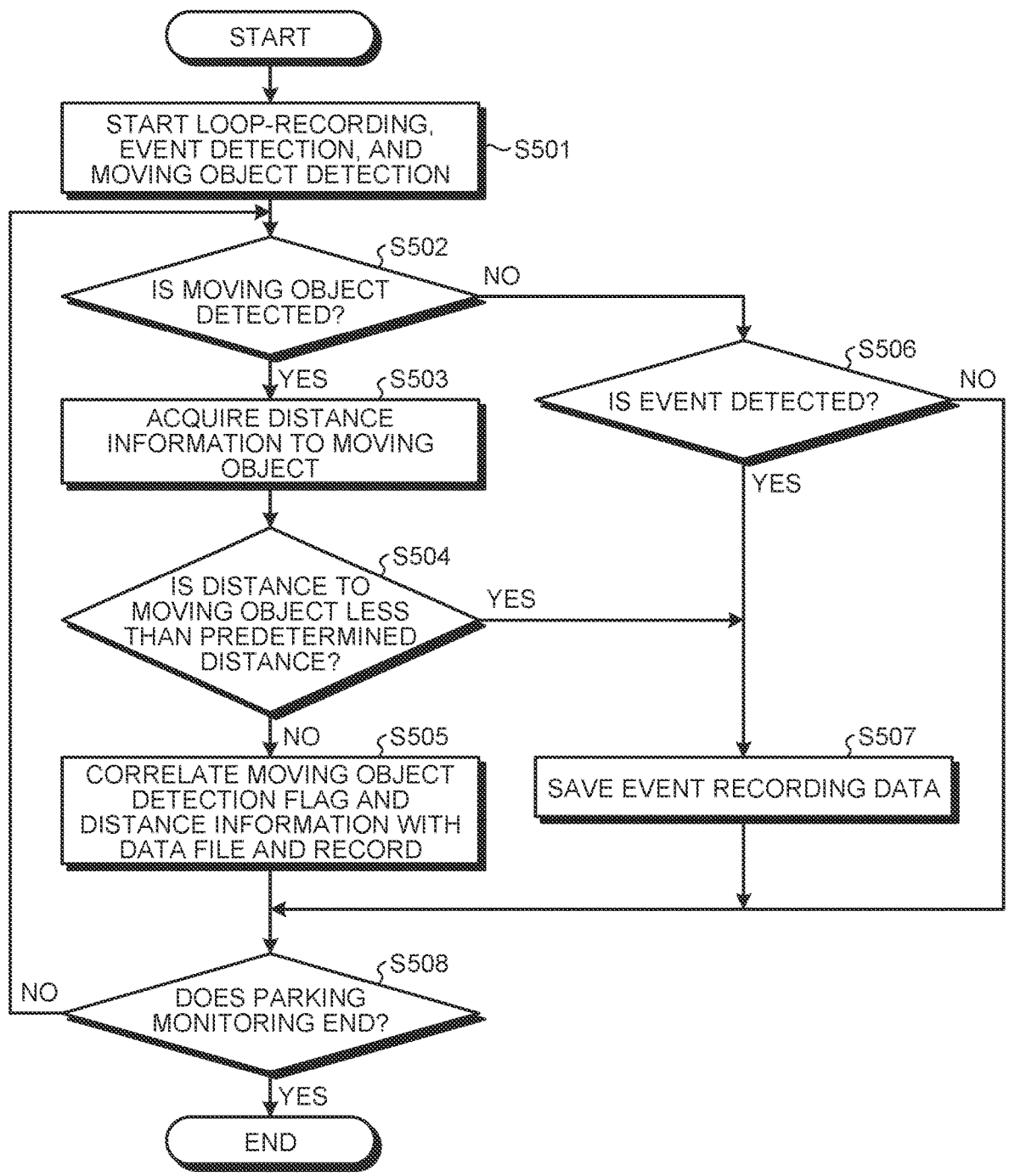
FIG. 7 is a flowchart illustrating one example of the procedure of the process of the control unit according to a third embodiment.

With reference to FIG. 7, the process of the control unit according to a third embodiment is described. FIG. 7 is a flowchart illustrating one example of the procedure of the process of the control unit according to the third embodiment. Note that since the structure of the recording control system according to the third embodiment is the same as that of the recording control system according to the first embodiment, the description is omitted.

Since the processes at step S501 to step S503 are respectively the same as the processes at step S301 to step S303 illustrated in FIG. 5, the description is omitted. In addition, since the processes at step S505 to step S508 are respectively the same as the processes at step S304 to step S307 illustrated in FIG. 5, the description is omitted. That is to say, the process illustrated in FIG. 7 is different from the process illustrated in FIG. 5 in that the process of step S504 is added after step S503.

After step S503, the control unit 100 determines whether the acquired distance to the moving object is less than a predetermined distance (step S504).

If the acquired distance is less than the predetermined distance (Yes at step S504), the control unit 100 advances to step S507. In this case, when the distance to the moving object is less than 1 m as the predetermined distance, the control unit 100 determines that it is the event and saves the event recording data.

On the other hand, if the acquired distance is not less than the predetermined distance (No at step S504), the control unit 100 advances to step S505.

Since the overwriting process according to the third embodiment is the same as that in the second embodiment, the description is omitted.

As described above, in the third embodiment, upon the detection of the moving object, the fact that the distance to the moving object is less than the predetermined distance can be detected as the event and saved as the event recording data. As a result, in the third embodiment, the photographic data containing the moving object that gets close to the vehicle can be saved as the event recording data. Thus, in the third embodiment, the video can be recorded more suitably.

Fourth Embodiment

Figure 8:
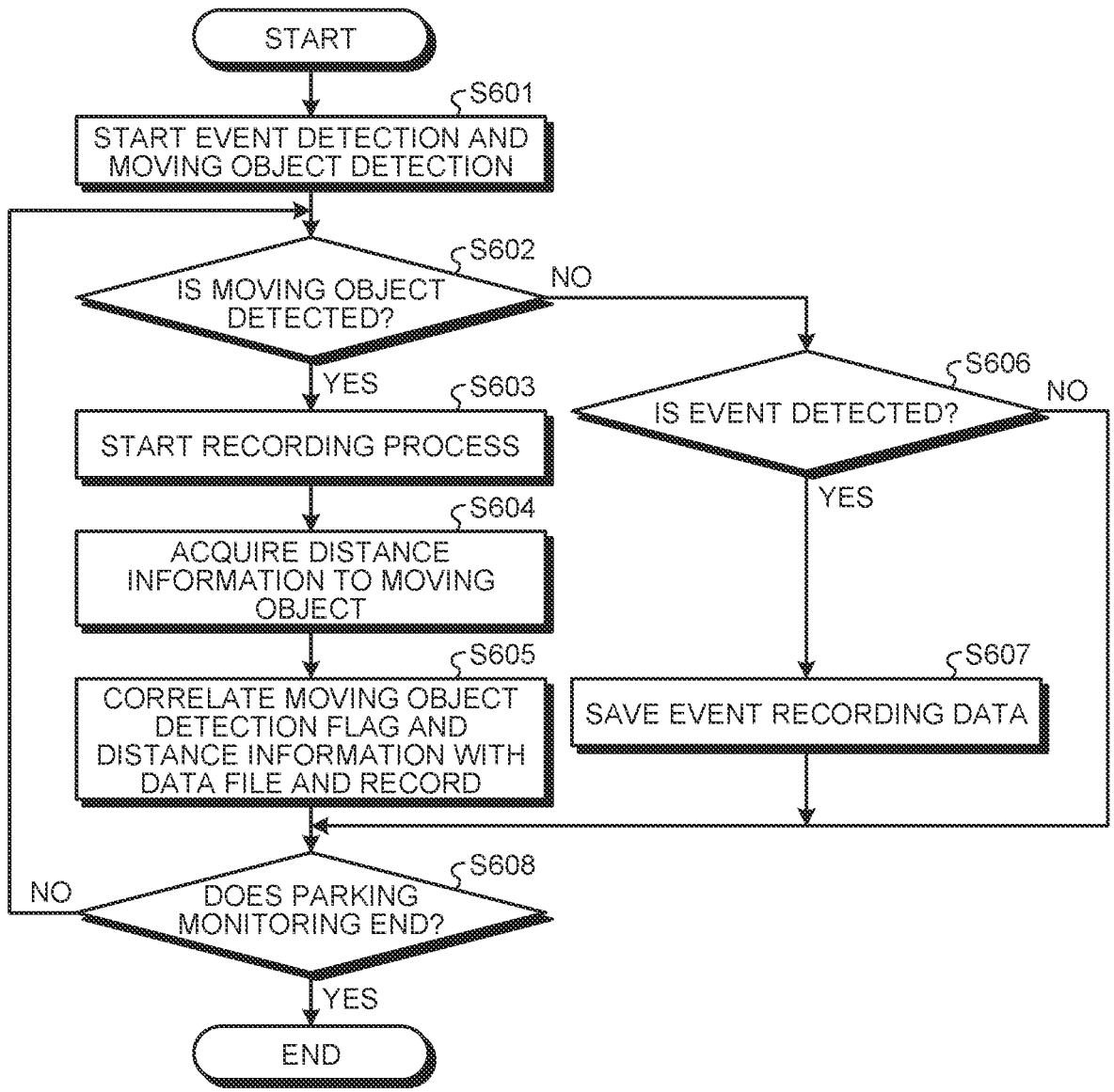
FIG. 8 is a flowchart illustrating one example of the procedure of the process of the control unit according to a fourth embodiment.

With reference to FIG. 8, the process of the control unit according to a fourth embodiment is described. FIG. 8 is a flowchart illustrating one example of the procedure of the process of the control unit according to the fourth embodiment. Note that since the structure of the recording control system according to the fourth embodiment is the same as that of the recording control system according to the first embodiment, the description is omitted.

The process in FIG. 8 is started when the parking monitoring function of the vehicle is operated. The parking monitoring function of the vehicle is started when the parking detection unit 129 detects that the vehicle is parked or when the start of the parking monitoring function is instructed by the user's operation of the operation unit 30, for example. First, the control unit 100 starts the event detection process and the moving object detection process in accordance with the start of the parking monitoring function (step S601). Then, the control unit 100 advances to step S602.

Next, the control unit 100 determines whether the moving object is detected from the photographic data (step S602). If the moving object is detected (Yes at step S602), the control unit 100 advances to step S603 and starts the recording process for the data file in which the moving object is detected (step S603). Then, the control unit 100 advances to step S604. On the other hand, if the moving object is not detected (No at step S602), the control unit 100 advances to step S606.

Since the processes at step S604 to step S608 are respectively the same as the processes at step S303 to step 5307 illustrated in FIG. 5, the description is omitted.

Figure 9:
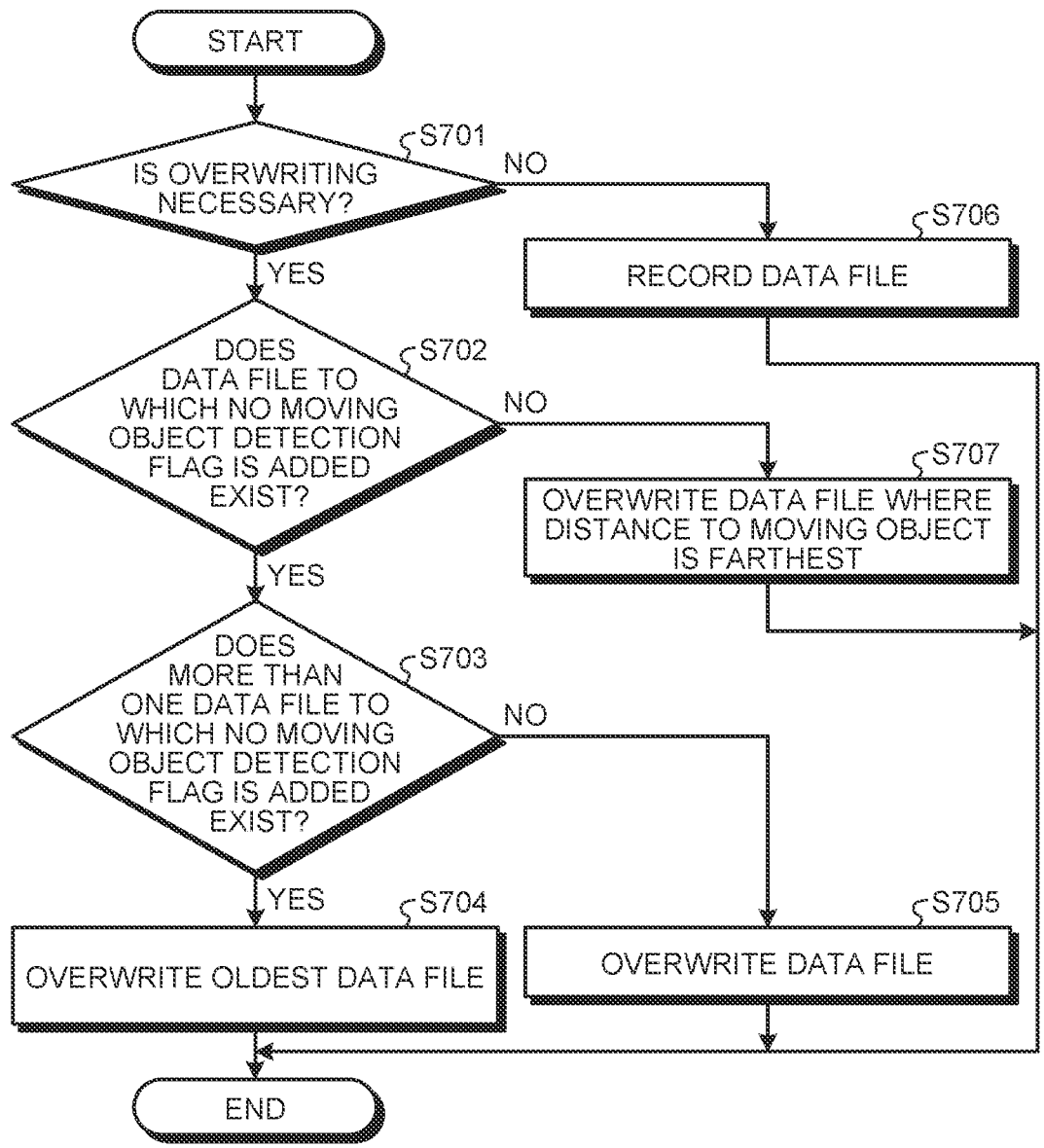
FIG. 9 is a flowchart illustrating one example of the procedure of the overwriting process according to the fourth embodiment.

Next, with reference to FIG. 9, the overwriting process of the control unit according to the fourth embodiment is described. FIG. 9 is a flowchart illustrating one example of the procedure of the overwriting process of the control unit according to the fourth embodiment. The process in FIG. 9 is performed every time the data file that can be overwritten is generated.

Since the processes at step S701 to step S706 are respectively the same as the processes at step S401 to step S406 illustrated in FIG. 6, the description is omitted.

If it is determined to be No at step S702, the control unit 100 advances to step S707, and the data file, among the data files to which the moving object detection flag is added, where the distance to the moving object is the farthest is overwritten (step S707). Then, the control unit 100 ends the process in FIG. 9.

As described above, in the fourth embodiment, the moving object detection flag and the distance information expressing the distance from the vehicle to the moving object can be correlated with the photographic data of the moving object and recorded only when the moving object is detected. Therefore, in the fourth embodiment, the photographic data can be recorded without performing the loop-recording, and thus, it is possible to prevent the unnecessary photographic data from consuming the capacity of the recording unit. Thus, in the fourth embodiment, the video can be recorded suitably.

In the fourth embodiment, when the photographic data is recorded in the recording unit as the data file, the photographic data can be recorded by overwriting the data file without the moving object with priority. In addition, in the fourth embodiment, in the case where the data file not containing the moving object no longer exists, the photographic data can be recorded by overwriting the data file in which the distance to the moving object is the farthest. Thus, the video can be recorded suitably in the fourth embodiment.

In addition, in the fourth embodiment, the moving object detection flag may be deleted when a predetermined time (for example, 48 hours) has passed after the flag is added. Thus, in the fourth embodiment, for example, it is possible to prevent the data file to which the moving object detection flag is added from consuming the capacity of the recording unit 20.

Fifth Embodiment

Figure 10:
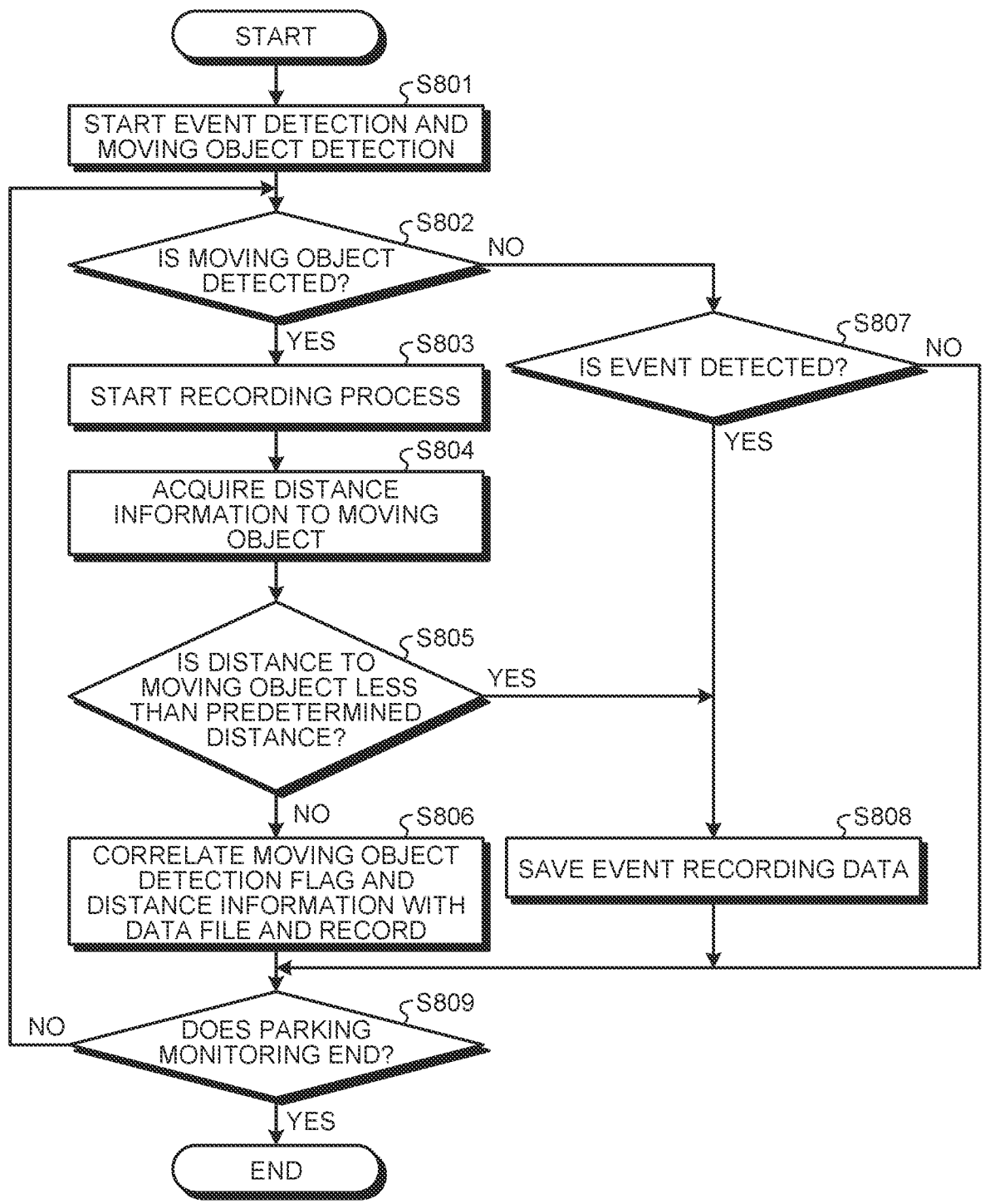
FIG. 10 is a flowchart illustrating one example of the procedure of the process of the control unit according to a fifth embodiment.

With reference to FIG. 10, the process of the control unit according to a fifth embodiment is described. FIG. 10 is a flowchart illustrating one example of the procedure of the process of the control unit according to the fifth embodiment. Note that since the structure of the recording control system according to the fifth embodiment is the same as that of the recording control system according to the first embodiment, the description is omitted.

Since the processes at step S801 to step S804 are respectively the same as the processes at step S601 to step S604 illustrated in FIG. 8, the description is omitted. In addition, since the processes at step S806 to step S809 are respectively the same as the processes at step S605 to step S608 illustrated in FIG. 8, the description is omitted. The process illustrated in FIG. 10 is different from the process illustrated in FIG. 8 in that the process of step S805 is performed between step S804 and step S806.

At step S805, the control unit 100 determines whether the distance to the moving object is less than a predetermined distance (step S805).

If the distance to the moving object is not less than the predetermined distance (No at step S805), the control unit 100 advances to step S806. On the other hand, if the distance to the moving object is less than the predetermined distance (Yes at step S805), the control unit 100 advances to step S808. That is to say, in the fifth embodiment, if the distance to the moving object is not less than the predetermined distance, the moving object detection flag and the distance information are correlated with the data file and recorded in the recording unit 20. If the distance to the moving object is less than the predetermined distance, the photographic data is saved as the event recording data.

Since the overwriting process in the fifth embodiment is the same as that in the fourth embodiment, the description is omitted.

As described above, in the fifth embodiment, in the case where the moving object is detected and the distance to the moving object is not less than the predetermined distance, the moving object detection flag and the distance information expressing the distance from the vehicle to the moving object can be correlated with the photographic data of the moving object and recorded. Moreover, in the fifth embodiment, in the case where the moving object is detected and the distance to the moving object is less than the predetermined distance, the photographic data can be saved as the event recording data. Therefore, in the fifth embodiment, it is possible to prevent the unnecessary photographic data from consuming the capacity of the recording unit. Thus, in the fifth embodiment, the video can be recorded more suitably.

Sixth Embodiment

Figure 11:
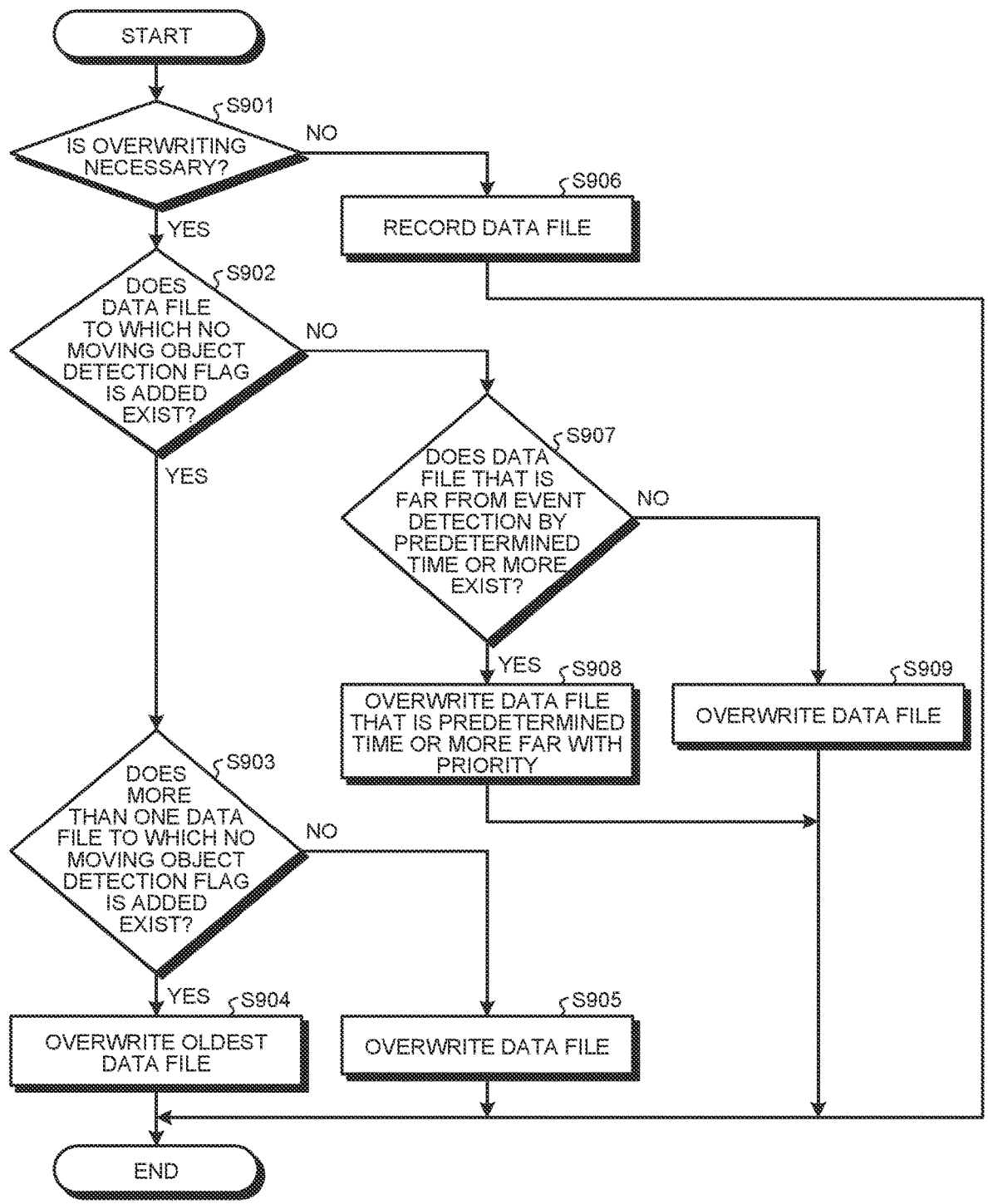
FIG. 11 is a flowchart illustrating one example of the procedure of the overwriting process of the control unit according to a sixth embodiment.

With reference to FIG. 11, the overwriting process of the control unit according to a sixth embodiment is described. FIG. 11 is a flowchart illustrating one example of the procedure of the overwriting process of the control unit according to the sixth embodiment. Note that since the structure of the recording control system according to the sixth embodiment is the same as that of the recording control system according to the first embodiment, the description is omitted.

Since the processes at step S901 to step S906 and step S909 are respectively the same as the processes at step S201 to step S206 and step S209 illustrated in FIG. 4, the description is omitted.

If it is determined to be No at step S902, the control unit 100 advances to step S907 and determines whether the data file that is temporally far from the event detection by a predetermined time or more exists (S907). At step S907, the control unit 100 determines whether the data file that is 10 minutes or more as the predetermined time far from the event detection exists, for example. Note that the predetermined time may be set by the user arbitrarily.

If it is determined that the data file that is the predetermined time or more far exists (Yes at step S907), the control unit 100 advances to step S908 and the data file that is the predetermined time or more far is overwritten with the new data file with priority (step S908). Then, the control unit 100 ends the process in FIG. 11. On the other hand, if it is determined that the data file that is the predetermined time or more far does not exist (No at step S907), the control unit 100 advances to step S909.

As described above, in the sixth embodiment, when the photographic data is recorded in the recording unit as the data file, the photographic data can be recorded by overwriting the data file not containing the moving object with priority. In addition, in the sixth embodiment, in the case where the data file not containing the moving object no longer exists, when the photographic data is recorded in the recording unit as the data file, the photographic data can be recorded by overwriting the data file that is the predetermined time far from the event detection with priority. Thus, the video can be recorded suitably in the sixth embodiment.

Seventh Embodiment

With reference to FIG. 12, the overwriting process of the control unit according to a seventh embodiment is described. FIG. 12 is a flowchart illustrating one example of the procedure of the overwriting process of the control unit according to the seventh embodiment. Note that since the structure of the recording control system according to the seventh embodiment is the same as that of the recording control system according to the first embodiment, the description is omitted.

Since the processes at step S1001 to step S1006 are the same as the processes at step S901 to step S906 illustrated in FIG. 11, the description is omitted. The process illustrated in FIG. 12 is different from the process illustrated in FIG. 11 in the process in the case where it is determined to be No at step S1002.

After it is determined to be No at step S1002, the control unit 100 advances to step S1007 and the data file to which the moving object detection flag is added that is the temporally farthest from the event detection time is overwritten with the new data file with priority (step S1007). Specifically, at step S1007, either before or after the event detection, the control unit 100 overwrites the data file that is the temporally farthest from the event detection with the new data file with priority. Then, the control unit 100 ends the process in FIG. 12.

As described above, in the seventh embodiment, in the case where the data file not containing the moving object no longer exists, the data file can be recorded by overwriting the data file that is the temporally farthest from the event detection with the new data file with priority. That is to say, in the seventh embodiment, the data file that may not be very relevant to the event can be overwritten with the new data file with priority. Thus, the video can be recorded more suitably in the seventh embodiment.

Eighth Embodiment

With reference to FIG. 13, the overwriting process of the control unit according to an eighth embodiment is described. FIG. 13 is a flowchart illustrating one example of the procedure of the overwriting process of the control unit according to the eighth embodiment. Note that since the structure of the recording control system according to the eighth embodiment is the same as that of the recording control system according to the first embodiment, the description is omitted.

Since the processes at step S1101 to step S1106 are respectively the same as the processes at step S1001 to step S1006 illustrated in FIG. 12, the description is omitted. In the process illustrated in FIG. 13, the process at step S1107 is different from the process at step S1007 illustrated in FIG. 12.

After it is determined to be No at step S1102, the control unit 100 advances to step S1107 and the data file to which the moving object detection flag is added that is the temporally farthest from the event detection and after the event detection is overwritten with the new data file with priority (step S1107). Specifically, at step S1107, the data file after the event detection is the object of the overwriting with priority, and the control unit 100 reduces the priority of the overwriting on the data file before the event detection compared to the data file after the event detection. Then, the control unit 100 ends the process in FIG. 13.

As described above, in the eighth embodiment, in the case where the data file not containing the moving object no longer exists, the data file that is the temporally farthest from the event detection and after the event detection can be overwritten with the new data file with priority so that the new data file can be recorded. In the eighth embodiment, the data file to be overwritten is limited to the data file after the event detection; thus, the data file before the event detection that is highly likely to be the photographic data relevant to the event can be left. In other words, in the eighth embodiment, by recording the data file that is the temporally farthest after the event detection with priority, the data file among the recorded data files that is the least relevant to the event is overwritten with the new data file with priority. Thus, the video can be recorded suitably in the eighth embodiment.

The embodiments of the present disclosure have been described; however, the present disclosure is not limited by the content of these embodiments. The aforementioned components may include the component that can be easily conceived by a person skilled in the art, and substantially the same component, that is, the component in the equivalent range. Furthermore, the components described above can be combined with each other as appropriate. In addition, various omissions, replacements, or changes are possible within the range not departing from the concept of the embodiments described above.

INDUSTRIAL APPLICABILITY

The recording control device, the recording control system, the recording control method, and the computer program according to the present disclosure can be used for a dashboard camera that is mounted on a vehicle, for example.

According to the present disclosure, the video can be recorded as appropriate during the parking.

What is claimed is:

1. A recording control device comprising a processor configured to:
   acquire photographic data from a camera that photographs a periphery of a vehicle;
   detect a moving object from the photographic data acquired while the vehicle is parked;
   detect an event to the vehicle;
   correlate detection information of the moving object with the photographic data to yield correlated information;
   loop-record the correlated information in a recording unit as a data file that is capable of being overwritten;
   in response to detection of the event, save, in the recording unit as the data file that must not be overwritten, the photographic data for a period defined at a time when the event is detected;
   determine whether to perform overwriting of the data file in the recording unit in response to a recording capacity of a loop-recording area for the data file that is capable of being overwritten being full;
   in response to determining that the overwriting of the data file in the recording unit is to be performed, perform the overwriting by reducing priority of the overwriting on the data file in which the moving object is detected in a manner that the priority is lower as the data file is temporally closer to the time when the event is detected; and
   in response to determining that the overwriting of the data file in the recording unit is not to be performed, record the data file.

2. The recording control device according to claim 1, wherein the processor performs the overwriting by reducing more the priority of the overwriting on the data file that is temporally closer to the time before or after the event is detected.

3. The recording control device according to claim 1, wherein the processor performs the overwriting by reducing the priority of the overwriting on the data file that is temporally before the event is detected.

4. A recording control system comprising:
   the recording control device according to claim 1;
   a camera that photographs the periphery of the vehicle; and
   a recording unit that records the data file.

5. A recording control method comprising:
   acquiring photographic data from a camera that photographs a periphery of a vehicle;
   detecting a moving object from the photographic data acquired while the vehicle is parked;
   detecting an event to the vehicle;
   correlating detection information of the moving object with the photographic data to yield correlated information;
   recording the correlated information in a recording unit as a data file that is capable of being overwritten;
   in response to the detecting of the event, saving, in the recording unit as the data file that must not be overwritten, the photographic data for a period defined at a time when the event is detected;
   determining whether to perform overwriting of the data file in the recording unit in response to a recording capacity of a loop-recording area for the data file that is capable of being overwritten being full;
   in response to determining that the overwriting of the data file in the recording unit is to be performed, performing the overwriting by reducing priority of the overwriting on the data file in which the moving object is detected in a manner that the priority is lower as the data file is temporally closer to the time when the event is detected; and in response to determining that the overwriting of the data file in the recording unit is not to be performed, recording the data file.

6. A non-transitory computer readable recording medium storing therein a computer program that causes a computer operating as a recording control device to perform operations, the operations comprising:

acquiring photographic data from a camera that photographs a periphery of a vehicle;

detecting a moving object from the photographic data acquired while the vehicle is parked;

detecting an event to the vehicle;

correlating detection information of the moving object with the photographic data to yield correlated information;

recording the correlated information in a recording unit as a data file that is capable of being overwritten;

in response to the detecting of the event, saving, in the recording unit as the data file that must not be overwritten, the photographic data for a period defined at a time when the event is detected;

determining whether to perform overwriting of the data file in the recording unit in response to a recording capacity of a loop-recording area for the data file that is capable of being overwritten being full;

in response to determining that the overwriting of the data file in the recording unit is determined to be performed, performing the overwriting by reducing priority of the overwriting on the data file in which the moving object is detected in a manner that the priority is lower as the data file is temporally closer to the time when the event is detected; and in response to determining that the overwriting of the data file in the recording unit is determined not to be performed, recording the data file.

* * * * *